US009539945B2

(12) United States Patent
Ryu et al.

(10) Patent No.: US 9,539,945 B2
(45) Date of Patent: Jan. 10, 2017

(54) PARKING AREA TRACKING APPARATUS AND METHOD THEREOF

(71) Applicants: Hyundai Motor Company, Seoul (KR); Kia Motors Corporation, Seoul (KR); Industry-University Cooperation Foundation Hanyang University, Seoul (KR)

(72) Inventors: Seong Sook Ryu, Seoul (KR); Eu Gene Chang, Gyeonggi-do (KR); Jae Seob Choi, Gyeonggi-do (KR); Dae Joong Yoon, Gyeonggi-do (KR); Jae Kyu Suhr, Incheon (KR); Ho Gi Jung, Seoul (KR)

(73) Assignees: Hyundai Motor Company, Seoul (KR); Kia Motors Corporation, Seoul (KR); Industry-University Cooperation Foundation Hanyang University, Seoul (KR)

( * ) Notice: Subject to any disclaimer, the term of this patent is extended or adjusted under 35 U.S.C. 154(b) by 447 days.

(21) Appl. No.: 14/166,099

(22) Filed: Jan. 28, 2014

(65) Prior Publication Data

US 2015/0116492 A1  Apr. 30, 2015

(30) Foreign Application Priority Data

Oct. 30, 2013 (KR) ........................ 10-2013-0130125

(51) Int. Cl.
*B60R 1/00* (2006.01)
*H04N 7/18* (2006.01)
(Continued)

(52) U.S. Cl.
CPC ............. *B60R 1/00* (2013.01); *G06K 9/00812* (2013.01); *G06T 7/204* (2013.01); *G06T 11/60* (2013.01);
(Continued)

(58) Field of Classification Search
CPC ................ B60R 1/00; B60R 2300/305; B60R 2300/806; G06T 2207/30264; G06K 9/00812
See application file for complete search history.

(56) References Cited

U.S. PATENT DOCUMENTS 7,741,961 B1 *  6/2010  Rafii ...................... B60Q 9/005
                                               340/435
2002/0175832 A1 * 11/2002  Mizusawa ............... G06T 11/00
                                               340/932.2
(Continued)

FOREIGN PATENT DOCUMENTS

KR  10-2010-0081964 A    7/2010
KR  10-2012-0091603      8/2012
(Continued)

*Primary Examiner* — Andy Rao
*Assistant Examiner* — Tyler Edwards
(74) *Attorney, Agent, or Firm* — Mintz Levin Cohn Ferris Glovsky and Popeo, P.C.; Peter F. Corless

(57) ABSTRACT

A parking area tracking method includes: creating a top view image by capturing surroundings of a vehicle; setting a template by detecting a parking area in the top view image; detecting a location of a pillar in the top view image; detecting a region obstructed by the pillar from the parking area in which the template is set; and changing the shape of the template according to the obstructed region. A parking area tracking apparatus includes an imaging unit with a plurality of cameras for recording images around the vehicle, and a control unit for carrying out the steps of the parking area tracking method.

13 Claims, 10 Drawing Sheets

(51) Int. Cl.
*G06T 11/60* (2006.01)
*G06T 7/20* (2006.01)
*G06K 9/00* (2006.01)

(52) U.S. Cl.
CPC ......... *H04N 7/181* (2013.01); *B60R 2300/305* (2013.01); *B60R 2300/806* (2013.01); *G06T 2207/10004* (2013.01); *G06T 2207/20221* (2013.01); *G06T 2207/30264* (2013.01)

(56) References Cited

U.S. PATENT DOCUMENTS

| | | | |
|---|---|---|---|
| 2008/0055407 A1* | 3/2008 | Abe | G01C 21/26 348/118 |
| 2010/0238051 A1* | 9/2010 | Suzuki | B60R 1/00 340/932.2 |
| 2013/0058525 A1 | 3/2013 | Sugio | |
| 2013/0063594 A1 | 3/2013 | Hwang et al. | |

FOREIGN PATENT DOCUMENTS

| | | |
|---|---|---|
| KR | 10-2013-0025346 | 3/2013 |
| KR | 10-2013-0029262 | 3/2013 |
| KR | 10-2013-0030208 A | 3/2013 |
| KR | 10-2013-0072709 | 7/2013 |

* cited by examiner (a)

(b)

(a)  (b)

PARKING AREA TRACKING APPARATUS AND METHOD THEREOF

CROSS-REFERENCE TO RELATED APPLICATION

This application is based on and claims under 35 U.S.C. §119(a) priority from Korean Patent Application No. 10-2013-0130125, filed on Oct. 30, 2013 in the Korean Intellectual Property Office, the disclosure of which is incorporated herein in its entirety by reference.

BACKGROUND (a) Field of the Invention

The present invention relates to a parking area tracking apparatus and a method thereof, and more particularly, to a parking area tracking apparatus and a method capable of detecting and tracking a parking area around a vehicle to notify a driver thereof.

(b) Description of the Related Art

In general, the view of a driver seated in a vehicle mainly looks forward. Therefore, the left-side and right-side views and the rear view of the driver are very limited because they are substantially blocked by the vehicle body itself. In order to overcome this problem, means of affording visibility include mirrors to supplement the limited view of a driver, such as external mirrors. Recently, camera means have been used to capture video images outside a vehicle to provide it to a driver.

For example, there is a system known as around view monitoring (AVM) that has a plurality of cameras installed around a vehicle so as to show 360 degree images. The AVM system synthesizes images around a vehicle captured by a plurality of cameras, which are capturing areas around the vehicle so as to provide a top view image in which a driver may observe the vehicle as if he looks down at the vehicle from an aerial view, thereby displaying obstacles and parking areas around the vehicle and eliminating blind spots.

SUMMARY

In detecting and tracking a parking area in the AVM system, continuous tracking may become impossible if the parking area is obstructed by an obstacle such as a pillar in a top view image.

One object to be achieved by the present invention is to provide a parking area tracking apparatus and a parking area tracking method capable of continuously tracking a parking area even if the parking area is obstructed by an obstacle such as a pillar.

In one aspect of the present invention, there is provided a parking area tracking method including: creating a top view image by capturing surroundings of a vehicle; setting a template by detecting a parking area in the top view image; detecting a location of a pillar in the top view image; detecting a region obstructed by the pillar from the parking area in which the template is set; and changing the shape of the template according to the obstructed region.

The detecting of the location of the pillar may include: setting a pillar detection region in the top view image; creating a straight line for every angle with respect to a location of a camera in the pillar detection region; detecting a ratio of edge pixels included in the straight line; and detecting the location of the pillar using the ratio of the edge pixels.

The detecting of the ratio of the edge pixels may include detecting a ratio of edge pixels having a particular direction among the edge pixels included in the straight line.

The detecting of the ratio of the edge pixels may include detecting a ratio of edge pixels having a brightness difference larger than a predetermined value by comparing edge pixels included in the straight line with a previous image.

The detecting of the pillar may include using location information of an object around the vehicle acquired by an ultrasonic sensor together with the ratio of edge pixels.

The detecting of the pillar may include: selecting a candidate pillar according to the ratio of the edge pixels; determining the location of the pillar in a first direction by comparing a width of the candidate pillar with a width of an object around the vehicle acquired by a ultrasonic sensor; and determining a location of the pillar in a second direction by using information on a distance from the vehicle to the pillar acquired by the ultrasonic sensor.

The changing of the shape of the template may include: splitting the template into a plurality of regions; and deleting a region obstructed by the pillar beyond a predetermined ratio from the plurality of split regions.

A parking area tracking apparatus may include: an imaging unit including a plurality of cameras for recording images around a vehicle; and a control unit configured to convert the recorded images into a top view image of the vehicle, set a template by detecting a parking area in the top view image, detect a location of a pillar in the top view image, detect a region obstructed by the pillar from the parking area in which the template is set, and change the shape of the template according to the obstructed region.

Further, the parking area tracking apparatus may include a display unit that displays the top view image, and a storage unit that stores information on the parking area, and the pillar detected by the control unit.

Additionally, the control unit may include a top-view-image creating unit that synthesizes the images around the vehicle to create the top view image, a parking area detecting unit that detects the parking area in the top view image created by the top-view-image creating unit, a template setting unit that creates the template for the parking area detected by the parking area detecting unit, and a pillar detecting unit that detects the location of the pillar in the top view image created by the top-view-image creating unit.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
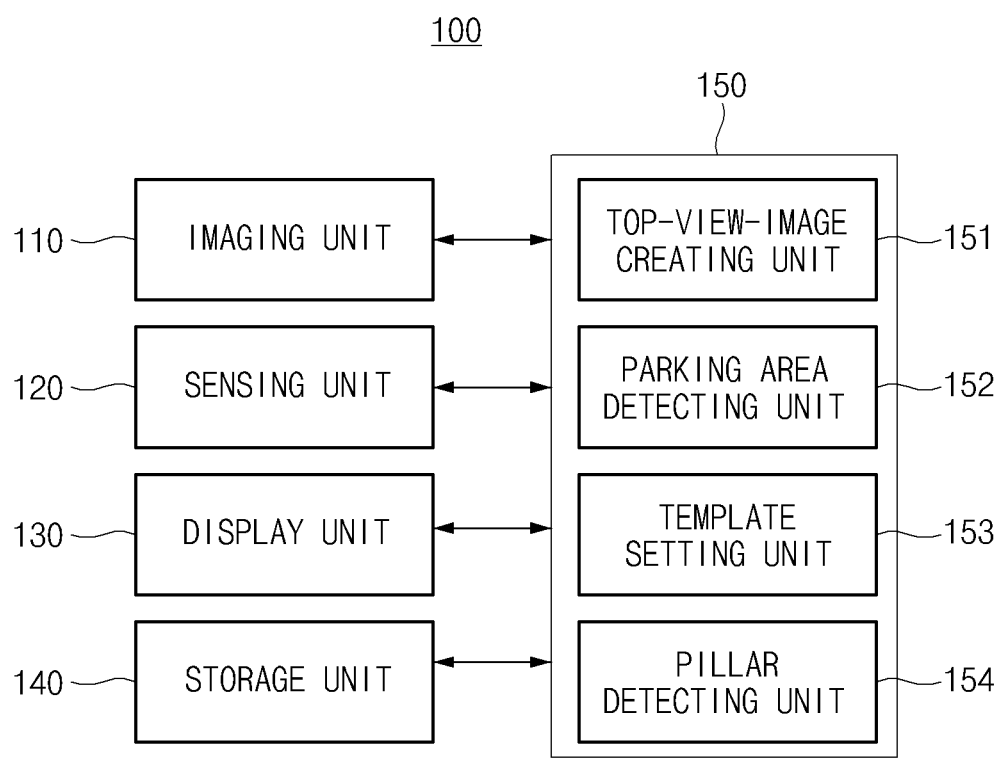
FIG. 1 is a block diagram illustrating the configuration of a parking area tracking apparatus according to an exemplary embodiment of the present invention.

FIG. 1 is a block diagram illustrating the configuration of a parking area tracking apparatus according to an exemplary embodiment of the present invention.

Referring to FIG. 1, the parking area tracking apparatus includes an imaging unit 110, a sensing unit 120, a display unit 130, a storage unit 140, and a control unit 150.

The imaging unit 110 captures the surroundings around a vehicle. The imaging unit 110 may include a plurality of cameras in order to record a 360 degree view around the vehicle. For example, the imaging unit 110 may include four cameras each installed at the front, rear, left side and right side. Further, the imaging unit 110 may be implemented as a wide angle camera in order to reduce the number of cameras to record around the vehicle.

The images around the vehicle captured by the imaging unit 110 may be converted into a top view image in which the vehicle is seen from above (i.e., overhead) through video processing by the control unit 150. The imaging unit 110 may continuously record surroundings around the vehicle so that the driver may be provided with information regarding the surroundings around the vehicle continuously.

The sensing unit 120 senses information on a condition of the vehicle. The sensing unit 120 may include a steering angle sensor and a wheel speed sensor to sense the travel distance and direction of the vehicle. In addition, the sensing unit 120 may include an ultrasonic sensor to detect the location of an object around the vehicle.

The display unit 130 displays a top view image. In addition, the display unit 130 may display a parking area and a template set for the parking area in the top view image. The display unit 130 may be implemented with various display panels such as a liquid crystal display (LCD), an organic light emitting display (OLED) or a plasma display panel (PDP), and may also be implemented with a transparent display panel or a flexible display panel.

The storage unit 140 may store information on a parking area and a pillar detected by the control unit 150. The storage unit 140 may store a list of parking areas and pillars included in a top view image. Thereafter, if a new parking area and a pillar are detected in a top view image as the vehicle moves, the new parking area and pillar may be stored. Further, the storage unit 140 may store a shape of template to be set for a parking area.

The control unit 150 controls overall operations of the parking area tracking apparatus 100. Further, the control unit 150 may detect a parking area from the top view image and set a template to track the parking area. Further, if a parking area is obstructed by a pillar, a shape of a template set for the parking area may be changed. Hereinafter, the configuration of the control unit 150 will be described in detail.

Referring to FIG. 1, the control unit 150 may include a top-view-image creating unit 151, a parking area detecting unit 152, a template setting unit 153, and a pillar detecting unit 154.

The top-view-image creating unit 151 may synthesize images around a vehicle captured by the imaging unit 110 to create a top view image.

The parking area detecting unit 152 detects a parking area in the top view image created by the top-view-image creating unit 151. Further, the parking area detecting unit 152 may create a list of detected parking areas. Specifically, when a parking area is detected in a top view image, it is determined that the detected parking area is identical to a parking area previously detected by taking into account the displacement as a vehicle moves. If it is determined that the detected parking area is identical to the parking area previously detected, the detected parking area is incorporated into the parking area previously detected. Otherwise, the detected parking area is registered with the list of parking areas as a new parking area.

Further, the template setting unit 153 may create a template for a detected parking area by the parking area detecting unit 152. If a number of parking areas are detected in a top view image, a template may be set by a user's selection or automatically in a parking area determined as the best in view of the current location of the vehicle and obstacles.

If there is a pillar near a parking area, a region obstructed by the pillar may be detected from the areas for which the template is set. If there is a region obstructed by a pillar, the shape of a template may be changed according to the obstructed part. Specifically, a template may be split into a plurality of regions, and a region of the split regions may be deleted that is obstructed by the pillar beyond a predetermined ratio.

The pillar detecting unit 154 detects the location of a pillar in the top view image created by the top-view-image creating unit 151. The pillar detecting unit 154 sets a pillar detection region in the top view image and then creates a straight line for every angle with respect to the location of a camera. Then, the pillar detecting unit 154 detects the ratio of edge pixels included in the straight lines and uses the portion of the edge pixels to detect a pillar. The pillar detecting unit 154 may detect the ratio of edge pixels having a particular direction to the edge pixels included in the straight lines when it detects the ratio of edge pixels. In addition, the pillar detecting unit 154 may compare the edge pixels included in the straight lines with a previous image to detect the ratio of edge pixels having a brightness difference larger than a predetermined value. Further, the pillar detecting unit 154 may use location information detected by the sensing unit 120 regarding objects detected around the vehicle to determine the location of a pillar.

Further, the pillar detecting unit 154 may create a list of detected pillars. Specifically, when a pillar is detected in a top view image, it is determined that the detected pillar is identical to a pillar previously detected by taking into account the displacement as a vehicle moves. If it is determined that the detected pillar is identical to the pillar previously detected, the detected pillar is incorporated into the pillar previously detected. Otherwise, the detected pillar is registered with the list of pillars as a new pillar.

Figure 2:
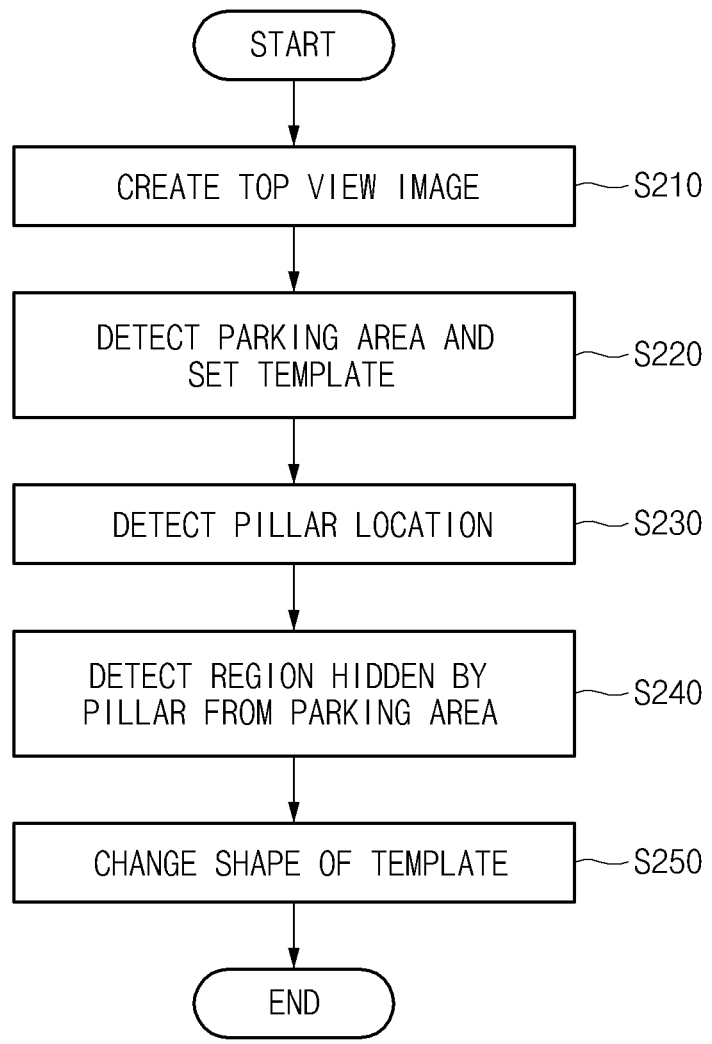
FIG. 2 is a flowchart illustrating a parking area tracking method according to an exemplary embodiment of the present invention.

FIG. 2 is a flowchart illustrating a parking area tracking method according to an exemplary embodiment of the present invention.

Referring to FIG. 2, the parking area tracking method performed in the parking area tracking apparatus 100 includes creating a top view image (S210), and setting a template by detecting an area in which a vehicle can park in the created top view image (S220). Then, the location of a pillar is detected in the top view image (S230), a region obstructed by the pillar of the area in which a template is set is detected (S240), and the shape of the template is changed according to the obstructed region (S250). Although the parking area is detected, the template is set, and then the location of the pillar is detected in FIG. 2, it is merely an exemplary embodiment and the steps may be performed in reverse order or simultaneously. Hereinafter, each of the steps will be described in detail.

First, a top view image is created (S210). Specifically, 360 degree view images are captured all around a vehicle, and the captured images are synthesized to create a top view image. To this end, the parking area tracking apparatus 100 may include a number of cameras. A technology to process the video images captured around a vehicle to convert them into a top view image is already well known in the art and, therefore, will not be described herein.

Once the top view image is created, a parking area is detected in the top view image and a template is set for the parking area (S220). By setting the template in the parking area, it is possible to continuously track the parking area. This will be described in detail with reference to FIG. 3.

Figure 3:
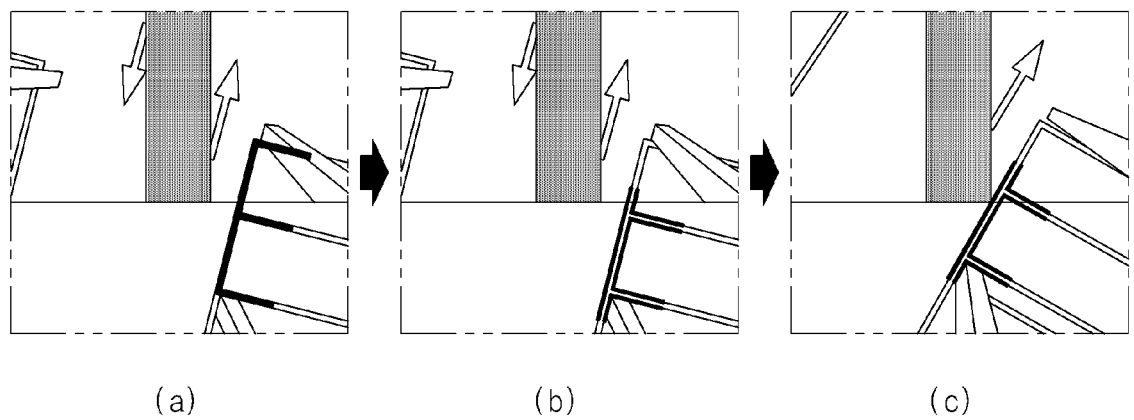
FIGS. 3(a) to 3(c) are schematic depictions for illustrating processes of detecting a parking area and of setting a template according to an exemplary embodiment of the present invention.

FIGS. 3(*a*) to 3(*c*) are schematic depictions for illustrating processes of detecting a parking area and of setting a template according to an exemplary embodiment of the present invention.

FIG. 3(*a*) shows a top view image in which parking areas are detected. Referring to FIG. 3(*a*), it can be seen that a number of parking areas are detected in the top view image. Once parking areas are detected, a list of detected parking areas may be created. Specifically, when a parking area is detected in the top view image, it is determined that the detected parking area is identical to a parking area previously detected by taking into account the displacement as a vehicle moves. If it is determined that the detected parking area is identical to the parking area previously detected, the detected parking area is incorporated into the parking area previously detected. Otherwise, the detected parking area is registered with the list of parking areas as a new parking area.

FIG. 3(*b*) shows the top view image in which a template is set for the detected parking area. Referring to FIG. 3(*b*), it can be seen that in one of the parking areas detected in FIG. 3(*a*) a template having shape of "TT" is set. If a number of parking areas are detected in a top view image, a template may be set by a user's selection or automatically in a parking area determined as the best in view of the current location of the vehicle and obstacles. FIG. 3(*c*) shows the top view image after the template is set in which the parking area is continuously tracked using the set template even if a vehicle moves.

Once the top view image is created, the location of a pillar is detected in the top view image (S230). This will be described with reference to FIG. 4 in detail.

Figure 4:
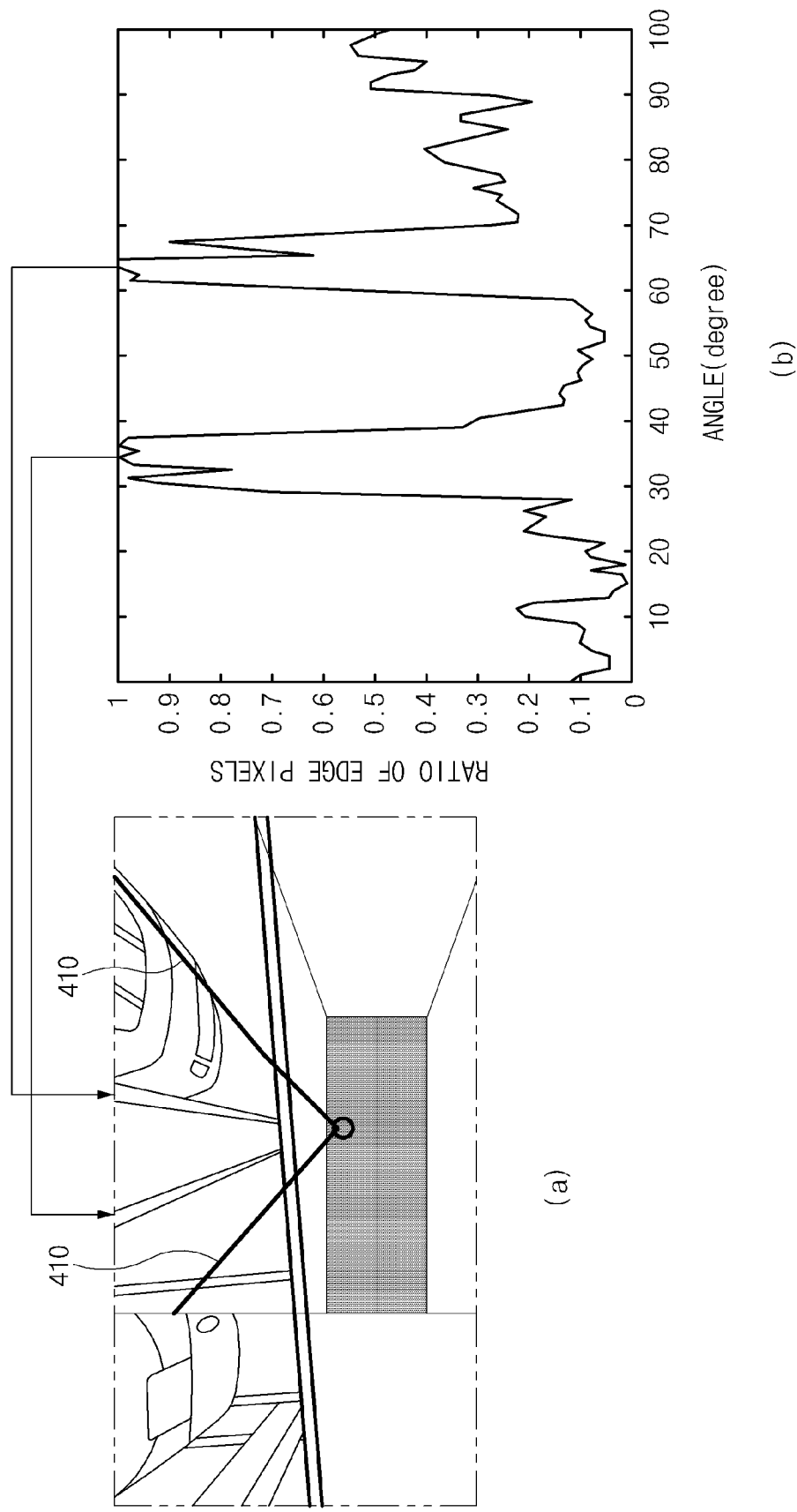
FIGS. 4(a) and 4(b) are schematic depictions for illustrating a process of detecting a pillar according to an exemplary embodiment of the present invention.

FIGS. 4(*a*) and 4(*b*) are schematic depictions for illustrating a process of detecting a pillar according to an exemplary embodiment of the present invention.

First, a pillar detection region is set for the top view image. In FIG. 4A, the region between two straight lines 410 having the angle of 100° with respect to the location of a camera is set as the pillar detection region. Because the objects displayed in the top view image in three dimensions are in a radial direction from the location of the camera, the pillar detection region may be set for the radial direction from the location of the camera, as shown in FIG. 4(*a*). The angle of the pillar detection region may be variously set. Because the shape of an object displayed in three dimensions is distorted as the angle becomes larger with respect to the location of the camera, a region with low reliability may be excluded by setting the pillar detection region, and data only in the pillar detection region may be processed so that the process speed may be increased. Among the pillar detection regions set for FIG. 4(*a*), a region between the vehicle and the parking lines may be excluded from the pillar detection region.

Once the pillar detection region is set, a straight line is created for every angle with respect to the location of the camera in the pillar detection region. Further, the ratio of the edge pixels included in the straight lines is detected. Specifically, the ratio of edge pixels may be detected based on the total number of pixels configuring each of the straight lines. The ratio of edge pixels may be represented by a histogram as shown in FIG. 4(*b*). Then, a region, in which the ratio of edge pixels is a predetermined ratio or higher, may be detected as the location of a pillar. Referring to FIG. 4(*b*), two peaks appearing between approximately 35° and approximately 65° may correspond to both edges of the pillar, and the location of the pillar may be detected using the two peaks shown in the histogram.

In detecting the ratio of edge pixels, the ratio of edge pixels having a particular direction to the edge pixels included in the straight lines may be detected. This will be described in detail with reference to FIG. 5.

Figure 5:
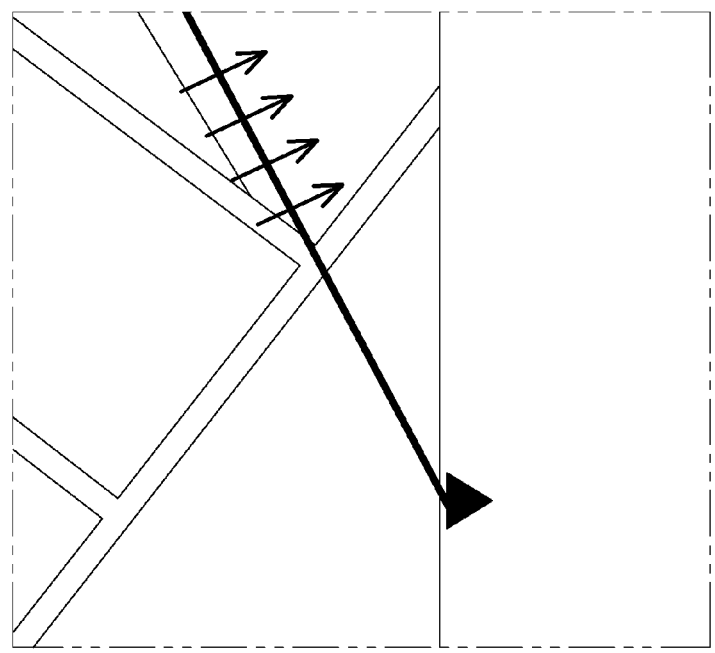
FIGS. 5(a) and 5(b) are schematic depictions for illustrating a process of detecting edge pixels according to an exemplary embodiment of the present invention.
Figure 5:
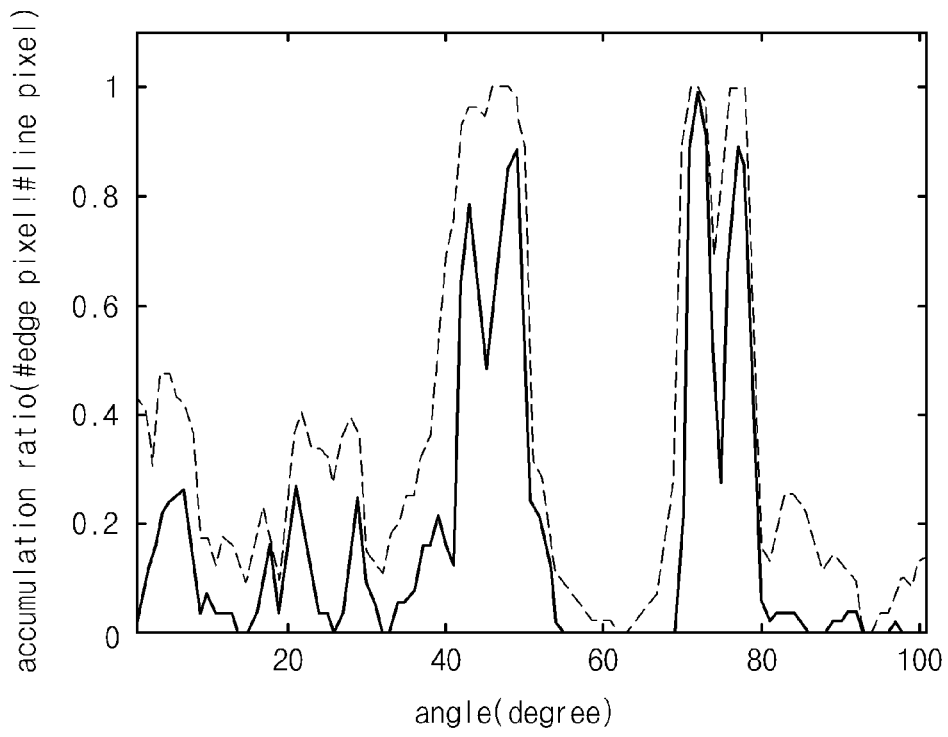

FIGS. 5(*a*) and 5(*b*) are schematic depictions for illustrating a process of detecting edge pixels according to an exemplary embodiment of the present invention.

Referring to FIG. 5(*a*), edge pixels having the directivity of ±90° with a straight line created for detecting edge pixels may be detected. An object displayed in the top view image in three dimensions may extend in the radial direction from the location of the camera. Accordingly, among the straight lines created for detecting edge pixels, edge pixels included in a straight line forming a boundary line of the pillar may have the directivity of ±90° with the straight line as shown in FIG. 5(a). Therefore, in detecting edge pixels, edge pixels having the directivity of ±90° with the straight line are only detected and thus less edge pixels are detected in other areas than the pillar, thereby obtaining more clear peaks in the location of the pillar.

FIG. 5(b) shows a histogram when all edge pixels are included (indicated by the dashed line) and a histogram when edge pixels having a particular direction (indicated by the solid line). Referring FIG. 5(b), when the ratio of edges pixels having a particular direction is detected, clearer peaks may be detected than in the location of the pillar.

Figure 6:
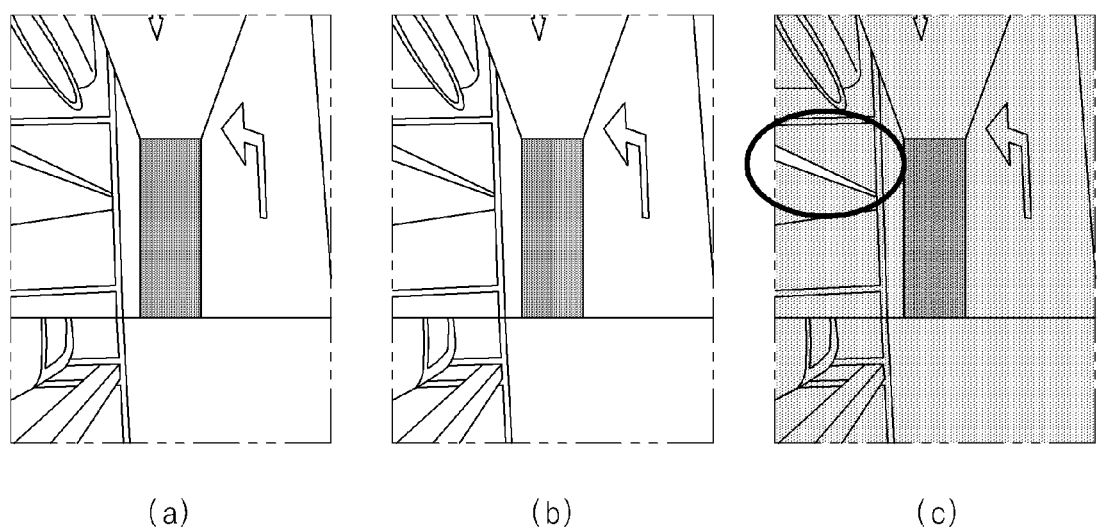
FIGS. 6(a) to 6(c) are schematic depictions for illustrating a process of detecting edge pixels according to another exemplary embodiment of the present invention.

In addition, in detecting the ratio of edge pixels, the edge pixels included in the straight lines may be compared with a previous image to detect the ratio of edge pixels having a brightness difference larger than a predetermined value. This will be described in detail with reference to FIG. 6.

FIGS. 6(a) to 6(c) are schematic depictions for illustrating a process of detecting edge pixels according to another embodiment of the present invention.

FIG. 6(a) is a current top view image, FIG. 6(b) is a previous top view image, and FIG. 6(c) is an image showing a brightness difference after a location difference due to movement of a vehicle has been corrected. In obtaining the brightness difference between the current top view image and the previous top view image, in order to compensate for a difference in the distance by movement of the vehicle in the images, one of the two top view images becomes a reference and the other may be matched therewith. The distance and direction of movement of the vehicle may be calculated using a steering angle sensor value and a wheel speed sensor value.

Since edge pixels corresponding to a pillar do not exist on the floor, there may be a large brightness difference between the current top view image and the previous top view image. Referring to FIG. 6(c), it can be seen that there is a large brightness difference on a boundary line corresponding to the pillar. Accordingly, in detecting the ratio of edge pixels, among the edges pixels included in the straight lines, the ratio of edge pixels having a brightness difference larger than a predetermined value may be detected, so that it is possible to avoid edge pixels on the floor from being detected.

Figure 7:
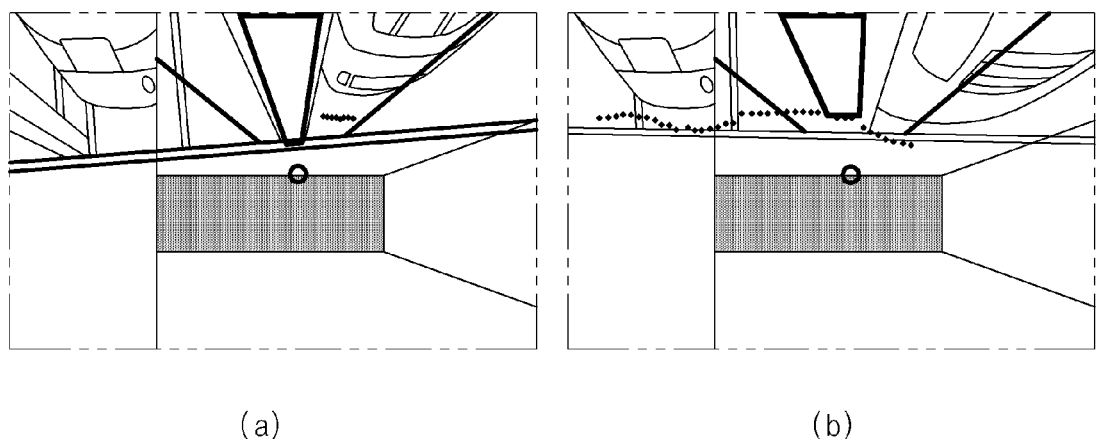
FIGS. 7(a) and 7(b) are schematic depictions for illustrating a process of detecting edge pixels according to yet another embodiment of the present invention.

Further, in detecting the location of the pillar using the ratio of edge pixels, location information on objects around the vehicle obtained from an ultrasonic sensor may also be used. This will be described in detail with reference to FIG. 7.

FIGS. 7(a) and 7(b) are schematic depictions for illustrating a process of detecting edge pixels according to yet another embodiment of the present invention.

Once the ratio of edge pixels included in the straight lines, candidate pillars may be selected according to the ratio of the edge pixels. Specifically, locations, in which the ratio of edge pixels is a predetermined ratio or higher, may be detected as the candidate pillars. In FIGS. 7(a) and 7(b), one candidate pillar is selected in the pillar detection region. Then, the width of the candidate pillar is compared with the widths of objects around the vehicle obtained by the ultrasonic sensor to confirm the pillar, thereby determining the location of the pillar in the first direction. Referring to the ultrasonic sensor information shown in FIGS. 7(a) and 7(b), discontinuous regions appear past the region corresponding to the candidate pillar. The width of the candidate pillar selected using the ratio of edge pixels is compared to the width of a region before the discontinuous region, so that it may be determined that the candidate pillar corresponds to the pillar and the location of the pillar in a first direction may be determined. Then, the location of the pillar in a second direction may be determined using distance information to the vehicle.

FIG. 7(a) shows detecting the location of the pillar in the second direction when the pillar is located on the same location with the first parking line, and FIG. 7(b) shows detecting the location of the pillar in the second direction when the pillar is located on the inner side of the first parking line.

In particular, if a number of parking areas having the same shape are arranged continuously, the direction in which the lines formed by the entrance line of a parking area extend is referred to as the first direction (hereinafter referred to as the primary direction), the direction perpendicular to the first direction is referred to as the second direction (hereinafter referred to as the secondary direction).

Further, the parking area tracing apparatus 100 may create a list of detected pillars. Specifically, when a pillar is detected in a top view image, it is determined that the detected pillar is identical to a pillar previously detected by taking into account the displacement as a vehicle moves. More specifically, the location of the currently detected pillar is compared with the previously detected pillar so as to determine if they are identical based on whether there is an overlapping portion. If it is determined that the currently detected pillar is identical to the previously detected pillar, the currently detected pillar is incorporated into the previously detected pillar. Otherwise, the currently detected pillar is registered with the list of pillars as a new pillar. In particular, in order to reliably detect a pillar, the pillar may be registered with the list of pillars only if it is detected more than two times at the same location.

After a template is set for the parking area and the location of the pillar is detected, a region obstructed by the pillar is detected from the parking area for which the template is set (S240). This will be described in detail with reference to FIG. 8.

FIGS. 8(a) to 8(c) are diagrams for illustrating a process of detecting a region obstructed by a pillar according to an exemplary embodiment of the present invention.

First, two points configuring edges of a pillar are set. A region obstructed by the pillar may be detected from the parking area in which the template is set based on the two points 810 and 820 configuring the edges of the pillar as shown in FIG. 8(a). The two points configuring the pillar may be set to be on the straight line in the primary direction.

Then, the location of the camera on the top view image is determined. The location of the camera may be determined based on the point closer to the cross point of the parking line in the primary direction and the parking line in the secondary direction among the two points configuring the pillar is included which of the camera areas in the top view image. Referring to FIG. 8(a), the location of the camera may be determined based on the point on the right side 810 is captured by which of the cameras.

Once the location of the camera is determined, a straight line 830 extending from the two points configuring edges of the pillar and a straight line 840 extending from the camera and the point closer to the cross point of the parking line in the primary direction and the parking line in the secondary direction are created.

Figure 8:
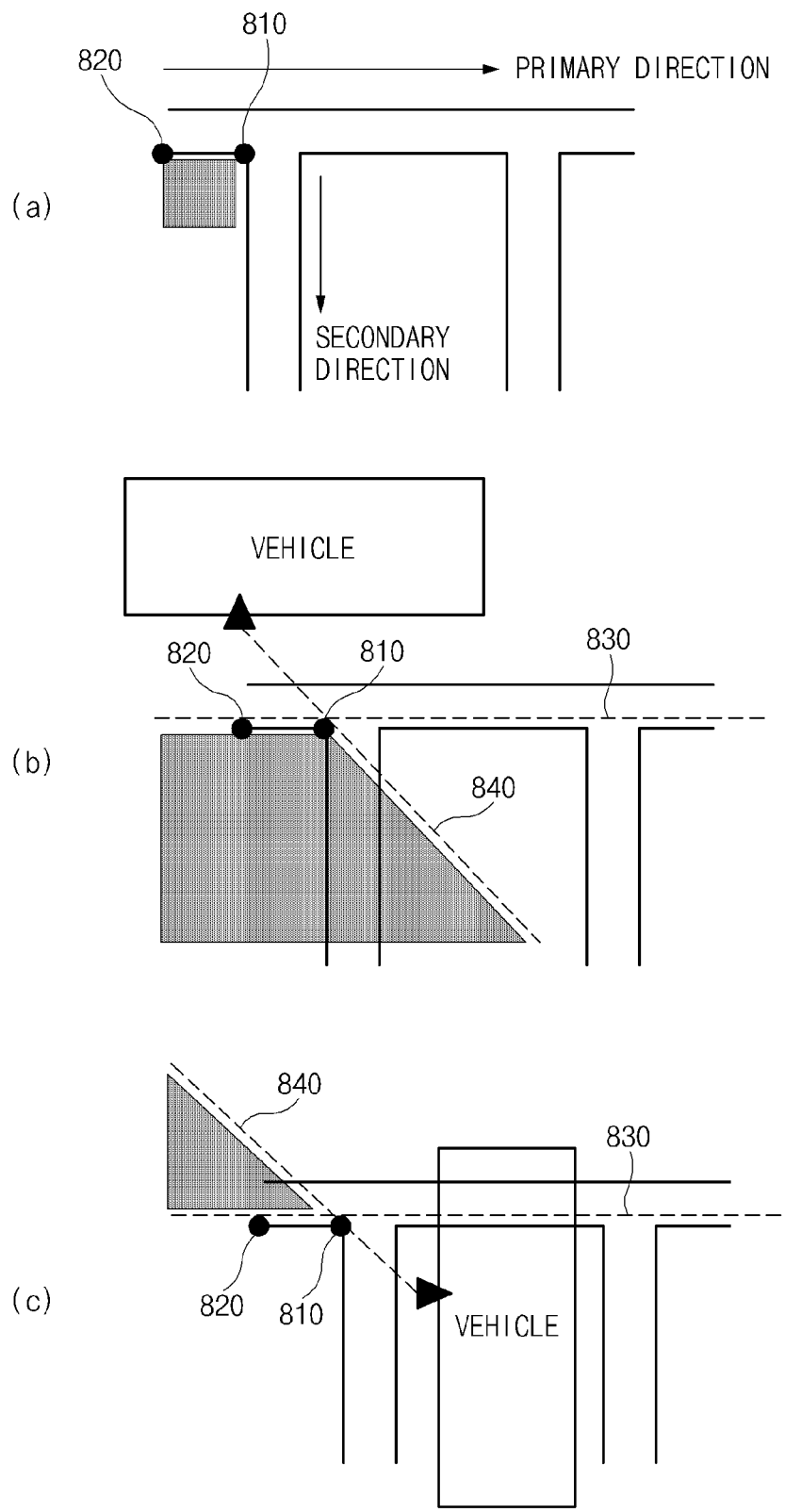
FIGS. 8(a) to 8(c) are diagrams for illustrating a process of detecting region obstructed by a pillar according to an exemplary embodiment of the present invention.

Then, the region obstructed by the pillar may be detected based on the relative location of the point 810 closer to the cross point of the parking line in the primary direction and the parking line in the secondary direction. If the camera is located on the outer side of the parking line with respect to the point 810 closer to the cross point of the parking line in the primary direction and the parking line in the secondary direction, as shown in FIG. 8(*b*), a region that is located on the inner side of the parking line and is closer to the other point 820 may be detected as a obstructed region from the four regions formed by the two straight lines. In addition, if the camera is located on the inner side of the parking line with respect to the point 810 closer to the cross point of the parking line in the primary direction and the parking line in the secondary direction, as shown in FIG. 8(*c*), a region that is located on the outer side of the parking line and is closer to the other point 820 may be detected as a obstructed region from the four regions formed by the two straight lines.

In addition to the above-described method, a method of detecting a region obstructed by the pillar may be performed by setting, as a region obstructed by the pillar, a region opposite to the camera with respect to two contact points among the regions formed by two straight lines in contact with the pillar with respect to the location of the camera.

Then, the shape of the template set for the parking area is changed according to the obstructed region. That is, the shape of the template may be variably set for view of the region obstructed by the pillar. Specifically, a template may be split into a plurality of regions, a region obstructed by the pillar beyond a predetermined ratio may be deleted from the split regions. This will be described with reference to FIG. 9.

Figure 9:
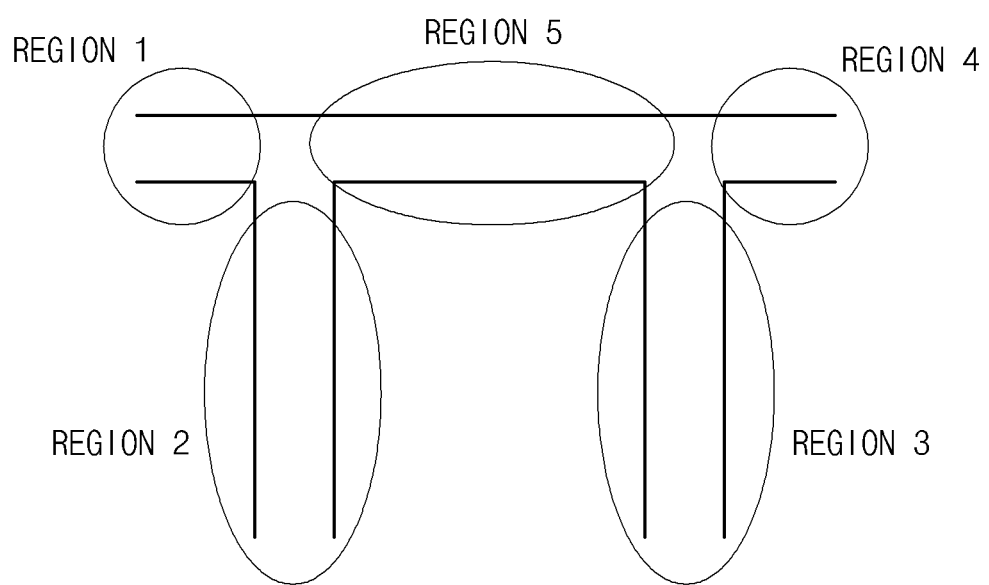
FIG. 9 is a diagram illustrating an example of splitting a template according to an exemplary embodiment of the present invention.

FIG. 9 shows an example of splitting a template according to an exemplary embodiment of the present invention.

Referring to FIG. 9, the template may be split into five regions. Regions 1 to 4 among the split regions may be obstructed by a pillar.

As shown in FIG. 9, for each of the split regions, if a region is obstructed by a pillar beyond a predetermined ratio (50%, for example), the region may be deleted so that the shape of the template may be changed. For example, in FIG. 8A, region 1 is obstructed beyond 50% so that region 1 may be deleted from the shape of the template. For example, in FIG. 8B, region 2 is obstructed beyond 50% so that region 2 may be deleted from the shape of the template.

Figure 10:
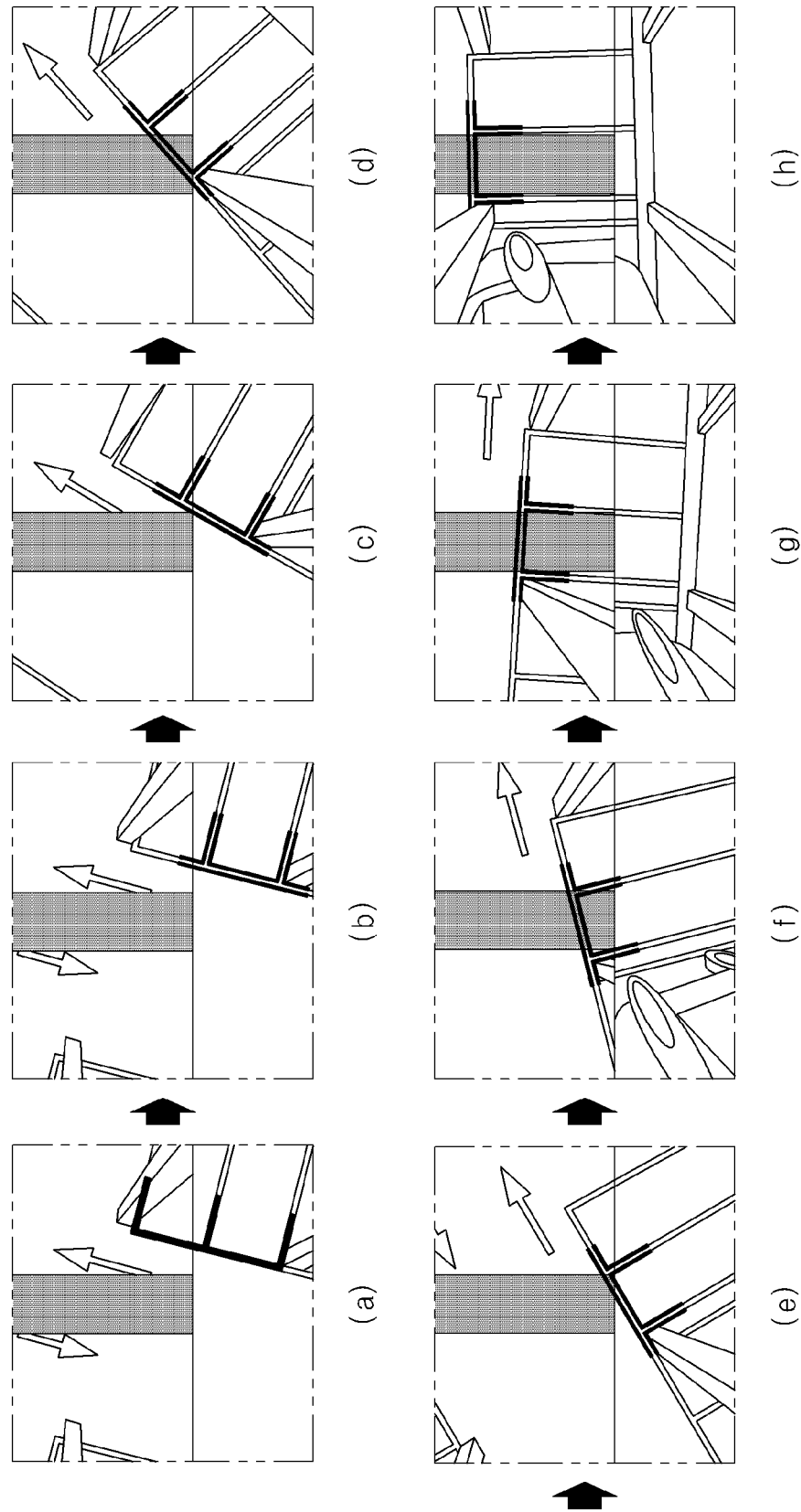
FIGS. 10(a) to 10(h) are schematic depictions showing a process of parking area tracking according to an exemplary embodiment of the present invention.

FIGS. 10(*a*) to 10(*h*) are schematic depictions showing a process of parking area tracking according to an exemplary embodiment of the present invention.

FIG. 10(*a*) shows a top view image in which parking areas are detected. FIG. 10(*b*) shows the top view image in which a template is set for one of the detected parking areas. Further, FIGS. 10(*c*) to 10(*g*) show tracking the parking area using the template as the vehicle moves. Finally, FIG. 10(*h*) shows the changed shape of the template by taking into account the region obstructed by the pillar.

As can be seen from FIGS. 10(*a*) to 10(*h*), according to the parking area tracking method according to an exemplary embodiment of the present invention, even if a region of a parking area is obstructed by an obstacle such as a pillar in the course of tracking the parking area using a template, the parking area may be continuously tracked by changing the shape of the template.

The parking area tracking methods according to exemplary embodiments of the present invention described above may be implemented as a program executable in a terminal device. Such a program may be stored in various types of tangible storage medium.

Specifically, program codes to perform the methods described above may be stored in various types of tangible storage mediums such as a flash memory, a read only memory (ROM), an erasable programmable ROM (EPROM), an electronically erasable and programmable ROM (EEPROM), a hard disk, a removable disk, a memory card, a USB memory, and CD-ROM.

As set forth above, according to exemplary embodiments of the present invention, a parking area can be continuously tracked even if the parking area is obstructed by an obstacle such as a pillar in the course of tracking the parking area using a template by way of changing the shape of the template.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A parking area tracking method, comprising the steps of:
    creating a top view image by capturing surroundings of a vehicle;
    setting a template by detecting a parking area in the top view image;
    detecting a location of a pillar in the top view image;
    detecting a region obstructed by the pillar from the parking area in which the template is set; and
    changing the shape of the template according to the obstructed region,
    wherein the step of detecting the location of the pillar includes steps of:
    setting a pillar detection region in the top view image;
    creating a straight line for every angle with respect to a location of a camera in the pillar detection region;
    detecting a ratio of edge pixels included in the straight line; and
    detecting the location of the pillar using the ratio of the edge pixels.

2. The parking area tracking method according to claim 1, wherein the step of detecting the ratio of the edge pixels includes detecting a ratio of the edge pixels having a particular direction among the edge pixels included in the straight line.

3. The parking area tracking method according to claim 1, wherein the step of detecting the ratio of the edge pixels includes detecting a ratio of the edge pixels having a brightness difference larger than a predetermined value by comparing the edge pixels included in the straight line with a previous image.

4. The parking area tracking method according to claim 1, wherein the step of detecting the pillar includes using location information of an object around the vehicle acquired by an ultrasonic sensor together with the ratio of the edge pixels.

5. The parking area tracking method according to claim 1, wherein the step of detecting the pillar includes:
    selecting a candidate pillar according to the ratio of the edge pixels;
    determining the location of the pillar in a first direction by comparing a width of the candidate pillar with a width of an object around the vehicle acquired by an ultrasonic sensor; and
    determining a location of the pillar in a second direction by using information on a distance from the vehicle to the pillar acquired by the ultrasonic sensor.

6. The parking area tracking method according to claim 1, wherein the step of changing the shape of the template includes:

splitting the template into a plurality of regions; and deleting a region obstructed by the pillar beyond a predetermined ratio from the plurality of split regions.

7. A parking area tracking apparatus, comprising:

an imaging unit including a plurality of cameras for recording images around a vehicle; and a control unit configured to convert the recorded images into a top view image of the vehicle, set a template by detecting a parking area in the top view image, detect a location of a pillar in the top view image, detect a region obstructed by the pillar from the parking area in which the template is set, and change the shape of the template according to the obstructed region wherein the detecting of the location of the pillar comprises:

setting a pillar detection region in the top view image;

creating a straight line for every angle with respect to a location of a camera in the pillar detection region;

detecting a ratio of edge pixels included in the straight line; and detecting the location of the pillar using the ratio of the edge pixels.

8. The parking area tracking apparatus of claim 7, further comprising a display unit that displays the top view image.

9. The parking area tracking apparatus of claim 7, further comprising a storage unit that stores information on the parking area, and the pillar detected by the control unit.

10. The parking area tracking apparatus of claim 7, wherein the control unit includes a top-view-image creating unit that synthesizes the images around the vehicle to create the top view image.

11. The parking area tracking apparatus of claim 10, wherein the control unit includes a parking area detecting unit that detects the parking area in the top view image created by the top-view-image creating unit.

12. The parking area tracking apparatus of claim 11, wherein the control unit includes a template setting unit that creates the template for the parking area detected by the parking area detecting unit.

13. The parking area tracking apparatus of claim 10, wherein the control unit includes a pillar detecting unit that detects the location of the pillar in the top view image created by the top-view-image creating unit.

* * * * *